United States Patent
Knight et al.

(10) Patent No.: US 12,036,623 B2
(45) Date of Patent: Jul. 16, 2024

(54) MULTI-FUNCTIONAL LAYER FOR STOP ETCH IN LASER COATING REMOVAL

(71) Applicant: NORTHROP GRUMMAN SYSTEMS CORPORATION, Falls Church, VA (US)

(72) Inventors: Mark W. Knight, El Segundo, CA (US); Patrick W. Shindo, Rancho Palos Verdes, CA (US); Connor Limburg, Inglewood, CA (US); Jesse Tice, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 18 days.

(21) Appl. No.: 17/498,270

(22) Filed: Oct. 11, 2021

(65) Prior Publication Data

US 2023/0113120 A1 Apr. 13, 2023

(51) Int. Cl.
| | |
|---|---|
| *B23K 26/00* | (2014.01) |
| *B05D 5/06* | (2006.01) |
| *B05D 7/00* | (2006.01) |
| *B23K 26/362* | (2014.01) |
| *B64C 1/12* | (2006.01) |
| *B64F 5/40* | (2017.01) |

(52) U.S. Cl.
CPC ............ *B23K 26/009* (2013.01); *B05D 5/067* (2013.01); *B05D 7/5883* (2013.01); *B23K 26/362* (2013.01); *B64C 1/12* (2013.01); *B64F 5/40* (2017.01)

(58) Field of Classification Search
CPC .... C09D 5/004; B23K 26/362; B23K 23/362; B23K 26/009; B41M 1/22; B05D 5/067; B05D 5/068; B05D 7/5883; B64F 5/40; B64C 1/12
See application file for complete search history.

(56) References Cited

U.S. PATENT DOCUMENTS

| | | | |
|---|---|---|---|
| 6,387,519 B1 * | 5/2002 | Anderson | C08J 3/20 524/588 |
| 7,525,065 B2 * | 4/2009 | Engler | B23K 26/361 219/121.69 |
| 2010/0316886 A1 | 12/2010 | Rashid et al. | |
| 2015/0283571 A1 | 10/2015 | Sais | |
| 2019/0127592 A1 * | 5/2019 | McQuown | C08G 18/4202 |

(Continued)

FOREIGN PATENT DOCUMENTS

| | | |
|---|---|---|
| WO | 0068330 | 11/2000 |
| WO | 2008127370 A2 | 10/2008 |

*Primary Examiner* — Monique R Jackson
(74) *Attorney, Agent, or Firm* — John A. Miller; Shumaker, Loop & Kendrick LLP

(57) ABSTRACT

An aircraft skin coating assembly for an aircraft. The coating assembly includes a primer layer deposited on the aircraft skin, an optical stop-etch layer deposited on the primer layer that is reflective at a predetermined wavelength, a coating stack-up deposited on the optical etch-stop layer that provides performance features for the aircraft, and a sealant layer deposited on the stack-up. When a laser coating removal process employing a laser beam is used to remove the coating stack-up for replacement, the stop-etch layer reflects the laser beam to prevent it from penetrating and possibly damaging the aircraft skin.

14 Claims, 2 Drawing Sheets

(56) References Cited

U.S. PATENT DOCUMENTS

| | | |
|---|---|---|
| 2020/0096687 A1 | 3/2020 | Ma et al. |
| 2021/0016319 A1* | 1/2021 | Brei ....................... C09J 163/00 |
| 2021/0156043 A1* | 5/2021 | Reyes Brondo ....... C23G 1/106 |
| 2022/0193832 A1* | 6/2022 | Blohowiak ............ B23K 26/18 |

* cited by examiner

MULTI-FUNCTIONAL LAYER FOR STOP ETCH IN LASER COATING REMOVAL

BACKGROUND

Field

This disclosure relates generally to a high performance coating for an aircraft skin and, more particularly, to a high performance coating for an aircraft skin that includes a reflective stop-etch layer that prevents a laser beam used in a laser coating removal process from damaging the skin.

Discussion of the Related Art

Various military aircraft rely on one or more types of coatings to provide a range of desirable performance features. These high performance coatings typically include a plurality of layers of various materials, where each layer may have a certain purpose or the combination of layers has a certain purpose. However, depending on the type of aircraft, the type of coating, the aircraft flying characteristics, etc., the performance of these coatings will be reduced over time. Therefore, these coatings generally need to be periodically stripped off of the aircraft and a new coating reapplied.

Traditionally, this stripping process was performed by labor intensive manual techniques, such as chemical applications, dry media blasting and hand sanding, which require a long time and are costly. Those techniques have recently been replaced with more cost effective laser coating removal (LCR) processes that employ a laser beam having a frequency that dissolves the coating, which have been shown to be effective. However, LCR requires careful calibration to insure that the laser beam removes all of the high performance coating, but does not impinge and possibly damage the underlying airframe, particularly for absorptive airframe composites. However, this calibration is precise and difficult to obtain.

DETAILED DESCRIPTION OF THE EMBODIMENTS

The following discussion of the embodiments of the disclosure directed to a high performance coating for an aircraft skin that includes a reflective stop-etch layer that prevents a laser beam used in a laser coating removal process from damaging the skin is merely exemplary in nature, and is in no way intended to limit the disclosure or its applications or uses.

Figure 1:
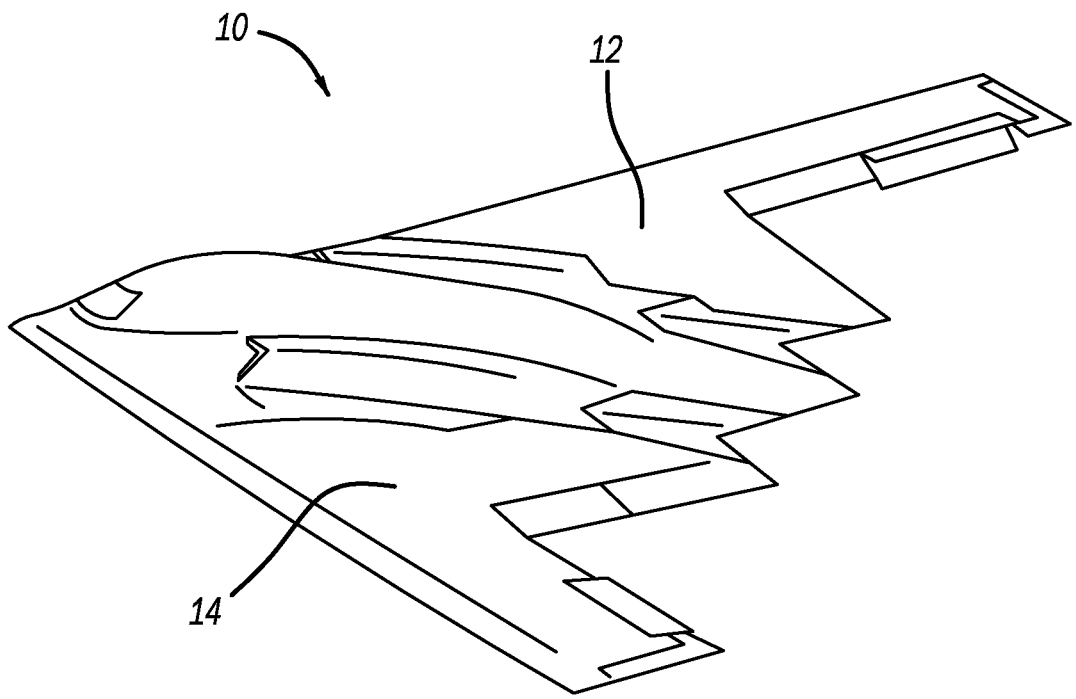
FIG. 1 is an isometric view of a B-2 bomber having a high performance coating on its airframe.

FIG. 1 is an isometric view of a B-2 bomber 10 having an outer airframe or skin 12, such as a composite, including a high performance coating 14, such as those discussed above, formed thereon.

Figure 2:
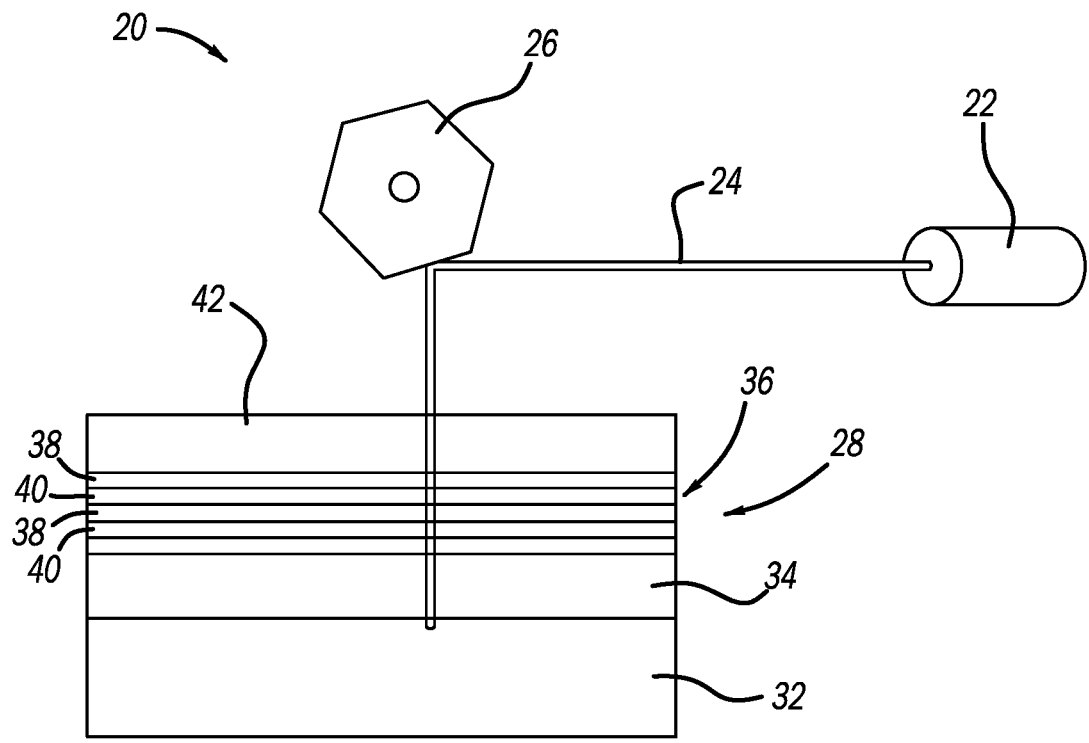
FIG. 2 is an illustration of an LCR system shown removing a high performance coating from a substrate in a known manner.

FIG. 2 is an illustration of an LCR system 20 that includes a laser 22, such as a 20 kW $CO_2$ laser, that generates a laser beam 24 having an appropriate wavelength, such as 10.6 μm, that is reflected off of a polygon mirror scanner 26 towards an aircraft coating assembly 28, such that as the scanner 26 rotates the beam 24 scans across the assembly 28 in a row-by-row manner in a known manner. The assembly 28 includes a substrate 32, such as an outer mold line (OML) of an aircraft skin composite. A primer layer 34 is deposited on the substrate 32 by, for example, spraying, and a high performance coating stack-up 36 including a plurality of alternating layers 38 and 40 is deposited on the primer layer 34, where the layers 38 and 40 can be any layer suitable for the purposes discussed herein. A protective top coat or sealant layer 42, such as a suitable polymer, for example, polyurethane, is then deposited on the coating stack-up 36.

As mentioned above, the coating stack-up 36 needs to be periodically replaced to maintain its performance. Therefore, the sealant layer 42 and the stack-up 36 need to be removed before the new stack-up is deposited. However, as also mentioned above, the known LCR processes employed for dissolving and removing the stack-up 36 are not controllable enough to prevent the laser beam 24 from propagating into the primer layer 34 and heating the substrate 32, which may damage the substrate 32, as shown by the depth that the laser beam 24 can obtain in FIG. 2.

Figure 3:
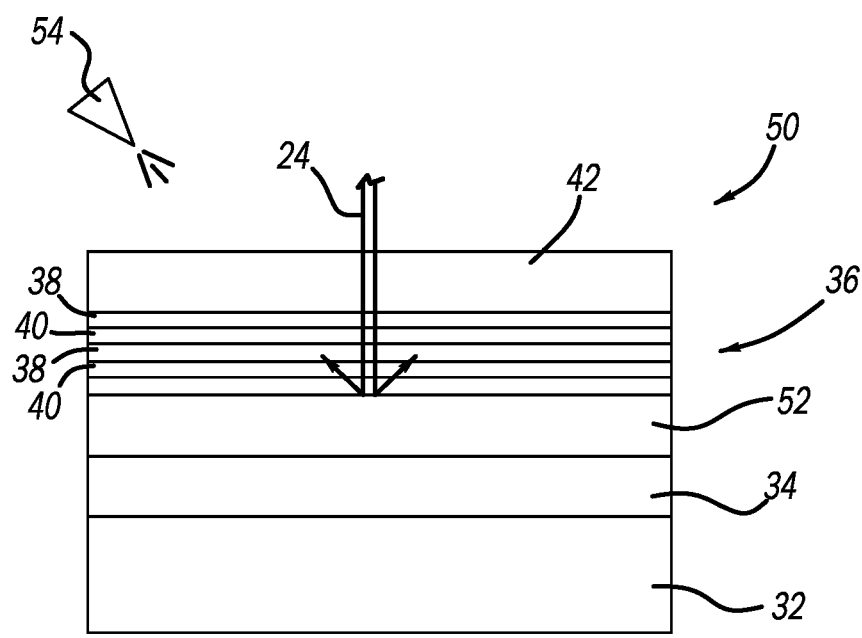
FIG. 3 is a profile view of a high performance coating including an optical stop-etch layer.

FIG. 3 is a profile view of an aircraft coating assembly 50 similar to the coating assembly 28, where like elements are identified by the same reference number. The assembly 50 includes an optical stop-etch layer 52 deposited on the primer layer 34, where the coating stack-up 36 is then deposited on the stop-etch layer 52. The stop-etch layer 52 is made of a suitable material such that it reflects the laser beam 24 so that the beam 24 does not penetrate the primer layer 34 and heat the substrate 32. In one non-limiting embodiment, the stop-etch layer 52 is 90% reflective at the wavelength of the beam 24 and is deposited as a low temperature reactive metallic ink that chemically reacts with the primer layer 34 to become a thin highly conductive metal layer to make a near perfect electrical conductor. The ink is formulated to produce a solid silver layer and provides a reflectivity equivalent to a vacuum-deposited material, but with room temperature application. The thickness of the stop-etch layer 52 can be only a few optical skin-depths at the laser wavelength (~microns), such as about 2.5 μm thick, and provides minimal grams per square meter (gsm) increase in the overall coating stack-up 36. Therefore, when the laser beam 24 is used to remove the coating stack-up 36 and the sealant layer 42, the laser beam 24 is reflected off of the stop-etch layer 52, and thus does not damage the primer layer 34 and the substrate 32. FIG. 3 shows a device 54 that can be used to deposit the stop-etch layer 52 using, for example, low temperature processes by, for example, aerosol jet, inkjet, screen printing and spray coating.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An aircraft skin coating assembly for an aircraft, said coating assembly comprising:
   a primer layer deposited on the aircraft skin;
   an optical stop-etch layer deposited on the primer layer, said stop-etch layer being optically reflective at a predetermined wavelength, wherein the optical stop-etch layer is a reactive metallic ink and is about 2.5 μm thick;

a coating stack-up deposited on the optical stop-etch layer, said coating stack-up including a plurality of layers each providing a different function from at least one other layer in the stack-up and providing performance features for the aircraft; and a sealant layer deposited on the stack-up, wherein the optical stop-etch layer operates and is configured to reflect a laser beam that is being used to remove the coating stack-up in a laser coating removal process, and wherein the reactive metallic ink and the 2.5 μm thickness of the optical stop-etch layer are effective to prevent the laser beam from penetrating the primer layer and heating the aircraft skin.

2. The assembly according to claim 1 wherein the optical stop-etch layer is 90% reflective at the predetermined wavelength.

3. The assembly according to claim 1 wherein the aircraft is a military aircraft.

4. The assembly according to claim 1 wherein the optical stop-etch layer is deposited on the primer layer by aerosol jet, inkjet, screen printing or spray coating.

5. An aircraft skin coating assembly for an aircraft, said coating assembly comprising:

a reactive metallic ink stop-etch layer deposited on the aircraft skin to a thickness of about 2.5 μm; and a coating stack-up deposited on the stop-etch layer, said coating stack-up including a plurality of layers each providing a different function from at least one other layer in the stack-up and providing performance features for the aircraft and said stop-etch layer operates and is configured to a reflect a laser beam that is used to remove the coating stack-up in a laser coating removal process to remove the coating stack-up, and wherein the reactive metallic ink and the 2.5 μm thickness of the optical stop-etch layer are effective to prevent the laser beam from heating the aircraft skin.

6. The assembly according to claim 5 further comprising a primer layer deposited on the aircraft skin between the skin and the stop-etch layer.

7. The assembly according to claim 5 further comprising a sealant layer deposited on the stack-up.

8. The assembly according to claim 5 wherein the stop-etch layer is 90% reflective at the predetermined wavelength.

9. The assembly according to claim 5 wherein the aircraft is a military aircraft.

10. The assembly according to claim 5 wherein the optical stop-etch layer is deposited by aerosol jet, inkjet, screen printing or spray coating.

11. A method for fabricating a coating assembly on an aircraft skin, said method comprising:

depositing a primer layer on the aircraft skin;

depositing an optical stop-etch layer on the primer layer, said stop-etch layer being optically reflective at a predetermined wavelength, wherein depositing an optical stop-etch layer includes depositing a reactive metallic ink to be about 2.5 μm thick;

depositing a coating stack-up on the optical stop-etch layer, said coating stack-up including a plurality of layers each providing a different function from at least one other layer in the stack-up and providing performance features for the aircraft, wherein the optical stop-etch layer operates and is configured to a reflect a laser beam that is being used to remove the coating stack-up in a laser coating removal process, and wherein the reactive metallic ink and the 2.5 μm thickness of the optical stop-etch layer are effective to prevent the laser beam from penetrating the primer layer and heating the aircraft skin; and depositing a sealant layer on the stack-up.

12. The method according to claim 11 wherein depositing the optical stop-etch layer causes the ink to chemically react with the primer layer to become a conductive metal layer.

13. The method according to claim 12 wherein the ink is formulated to produce a solid silver layer on the primer layer.

14. A method for removing a coating stack-up that is part of a coating assembly on an aircraft skin, said coating stack-up including a plurality of layers each providing a different function than at least one other layer in the stack-up and providing performance features for the aircraft, said coating assembly further including a primer layer on the aircraft skin and an optical stop-etch layer on the primer layer, said stop-etch layer being a reactive metallic ink about 2.5 μm thick and being optically reflective at a predetermined wavelength, said coating stack-up being on the stop-etch layer, said method comprising directing a laser beam into the coating stack-up that is reflected off of the optical stop-etch layer and removes the coating stack-up, wherein the reactive metallic ink and the 2.5 μm thickness of the optical stop-etch layer are effective to prevent the laser beam from penetrating the primer layer and heating the aircraft skin.

* * * * *